(12) United States Patent
Emerson

(10) Patent No.: US 9,522,788 B2
(45) Date of Patent: Dec. 20, 2016

(54) MOBILE CONVEYOR APPARATUS

(71) Applicant: FLSmidth A/S, Valby (DK)

(72) Inventor: Paul Scott Emerson, Nine Mile Falls, WA (US)

(73) Assignee: FLSMIDTH A/S (DK)

( * ) Notice: Subject to any disclaimer, the term of this patent is extended or adjusted under 35 U.S.C. 154(b) by 47 days.

(21) Appl. No.: 14/443,749

(22) PCT Filed: Dec. 6, 2013

(86) PCT No.: PCT/DK2013/050421
§ 371 (c)(1),
(2) Date: May 19, 2015

(87) PCT Pub. No.: WO2014/086377
PCT Pub. Date: Jun. 12, 2014

(65) Prior Publication Data
US 2015/0298914 A1    Oct. 22, 2015

(30) Foreign Application Priority Data

Dec. 7, 2012 (DK) .................................. 2012 70767

(51) Int. Cl.
*B65G 41/00* (2006.01)
*B65G 21/00* (2006.01)
(Continued)

(52) U.S. Cl.
CPC ............. *B65G 41/008* (2013.01); *B65G 65/28* (2013.01)

(58) Field of Classification Search
None
See application file for complete search history.

(56) References Cited

U.S. PATENT DOCUMENTS

| 4,345,680 A | 8/1982 | Kay |
| 4,646,906 A | 3/1987 | Wilcox et al. |

(Continued)

FOREIGN PATENT DOCUMENTS

| EP | 0252465 A2 | 1/1988 |
| JP | S5535725 A | 3/1980 |

(Continued)

OTHER PUBLICATIONS

The International Search Report and Written Opinion, 13 pages.

*Primary Examiner* — Kavel Singh
(74) *Attorney, Agent, or Firm* — Matthew R. Weaver; Jeffrey A. Sharp; Daniel DeJoseph

(57) ABSTRACT

Disclosed is a mobile conveyor apparatus comprising a bridge provided with at least one transport means for conveying material in the longitudinal direction of the bridge and support means extending from the bridge to the ground whereon the mobile conveyor apparatus is positioned where at least one of the support means is a travel support means connected to the bridge and being capable of moving the bridge on the ground and a movable conveyor arrangement supported by the bridge and configured for a back and forth movement on at least a portion of the bridge and being configured for interaction with the transport means. It is characterized in that at least one of the support means is a temporary support means comprising regulation means capable of establishing and removing ground contact.

9 Claims, 2 Drawing Sheets

(51) Int. Cl.
*B65G 21/10* (2006.01)
*B65G 65/28* (2006.01)

(56) References Cited

U.S. PATENT DOCUMENTS

| | | | | |
|---|---|---|---|---|
| 5,105,494 A | * | 4/1992 | Ogg | E01D 15/127 14/2.4 |
| 5,634,545 A | * | 6/1997 | Plumley | B65G 37/00 198/303 |
| 7,284,650 B2 | * | 10/2007 | Hoffmann | B65G 65/28 198/303 |
| 2003/0136632 A1 | | 7/2003 | Bernard | |
| 2004/0163926 A1 | | 8/2004 | Preuninger | |

FOREIGN PATENT DOCUMENTS

| | | |
|---|---|---|
| JP | H07 12324 U | 1/1995 |
| JP | 2003176692 A | 6/2003 |

* cited by examiner

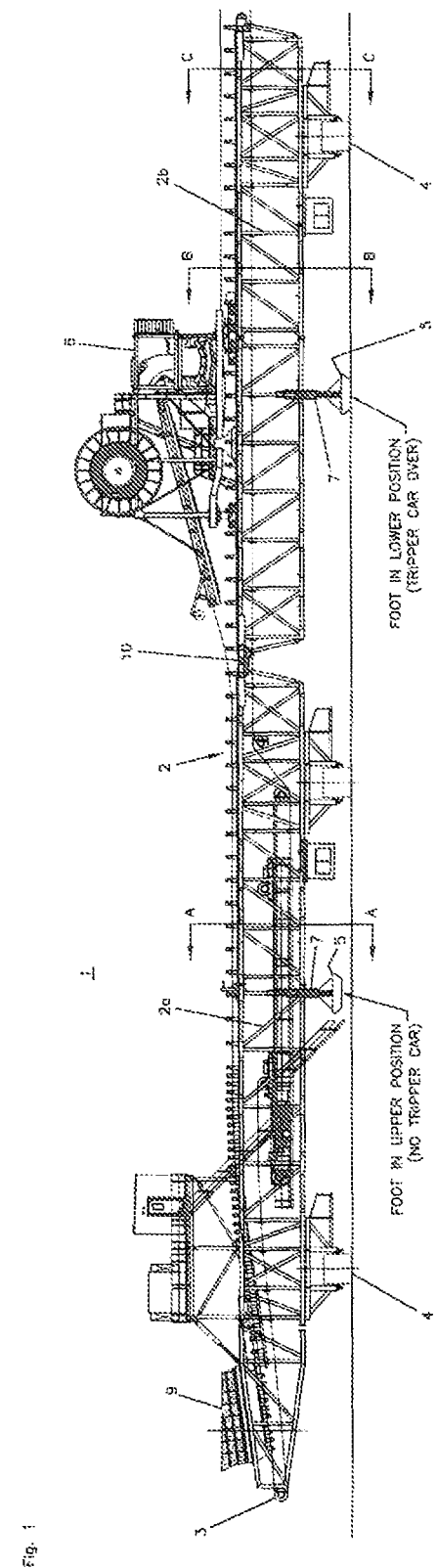

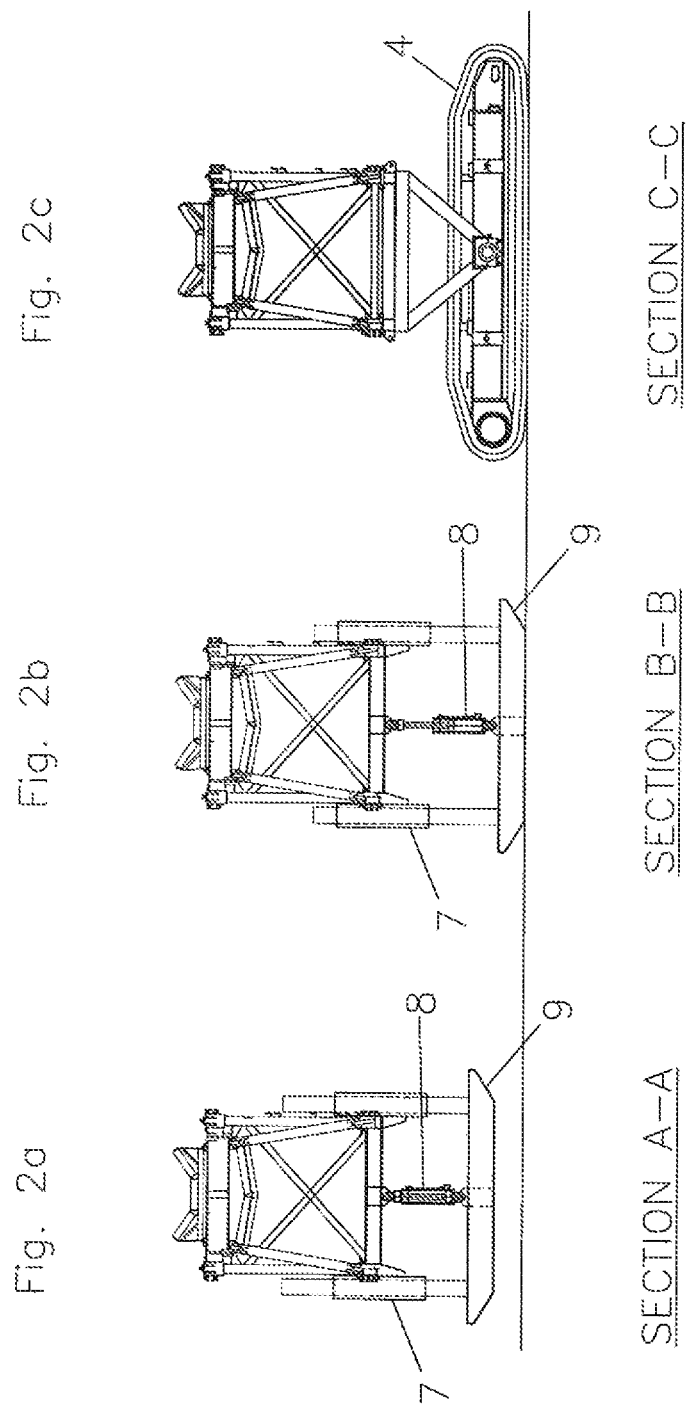

MOBILE CONVEYOR APPARATUS

The present invention relates to a mobile conveyor apparatus comprising a bridge provided with at least one transport means for conveying material in the longitudinal direction of the bridge and support means extending from the bridge to the ground whereon the mobile conveyor apparatus is positioned, where at least one of the support means is a travel support means connected to the bridge and being capable of moving the bridge on the ground and a movable arrangement supported by the bridge and configured for a back and forth movement on at least a portion of the bridge and being configured for interaction with the transport means. Also, the invention relates to a method of operating a mobile conveyor apparatus.

Mobile conveyor apparatuses of this kind are well-known in the patent literature, for example from U.S. Pat. No. 7,814,599B2 where a mobile bridge conveyor is disclosed. Such conveyors are used for example to convey material from the site of a mining operation to another location where it is stacked. Usually, several bridge sections are connected to form an elongated bridge on top of which a conveyor transports material. Often, also a movable tripper conveyor arrangement is connected and supported by the elongated bridge. This tripper conveyor arrangement which is configured for a movement on the bridge often, besides a tripper, also comprises a cross conveyor arranged perpendicular in relation to the bridge. The tripper ensures that the material transported on the bridge is diverted to the cross conveyor which transports the material to its destination. Such mobile bridge conveyors with a tripper interconnected to a cross conveyor are usually very heavy due to the structural design needed to support the material being transported. For instance, a tripper conveyor arrangement can weigh 100 tons or more. Because of the size and weight of the tripper conveyor arrangement and the movability of same, numerous portions of the frame of the bridge must be configured for these characteristics. Also crawler units, which usually support and move the bridge on the ground, must be sized for these loads. The structural design of the frame of the mobile bridge conveyor must be dimensioned for the situation where the tripper conveyor arrangement is located at mid-span of a section of the bridge between two crawler units since this is the most extreme situation for the load on the frame of the bridge. This load situation typically requires the frame of the mobile bridge conveyor to have a mass of more than 500 tons. A structural frame of such a weight is very expensive not only due to the actual materials needed for the manufacturing process but also because the crawlers which support as well as move the bridge must also be dimensioned to accommodate such a weight. Furthermore, the cost of handling and shipping equipment increases with the weight and size of equipment.

Earlier attempts to solve the above problems and minimize weight on the structure are known e.g. from U.S. Pat. No. 8,251,199. Historically, a cross conveyor is an integral part of a tripper and therefore both supported by a bridge structure. When the tripper is at mid-span, it is the worst case design condition structurally. In addition to the tripper weight and cross conveyors weight, the tripper usually houses an electrical room, operator cab, cable reel/drum, etc, and is therefore a very heavy machine of even more than 200,000 lbs that have to be supported mid-span. The solution provided by U.S. Pat. No. 8,251,199 is to provide a "driven cross conveyor", i.e. a cross-conveyor with driving means for driving supported on the ground, while the cross conveyor moves across the bridge structure. In this way only the tripper structure and pulleys are supported by the bridge structure, which is required for alignment and belt tracking, while everything else off the mobile conveyor machine e.g. the cross conveyor, electrical rooms, operator's cabs, cable reels etc. is supported on the ground. With this solution around 60% of the weight of a standard tripper and cross conveyor may be taken off the supporting bridge and only the weight of the much reduced tripper needs to be supported at mid-span hence reducing the heavier structure and tracks that would be required on the mobile bridge. However, the present invention does not have driving means for supporting the cross conveyor, electrical rooms, operator's cabs, cable reels etc., while the tripper moves across the bridge structure. The invention disclosed in U.S. Pat. No. 8,251,199 may well be used in combination with the present invention, since they are combinable and seeks to solve the problem in completely different ways, with different technical features.

Mobile conveyors are not to be confused with standard fixed floor mounted conveyors like described e.g. in U.S. Pat. No. 6,659,269. Temporary support in fixed floor mounted conveyors may be used to allow reconstruction of the fixed floor mounted conveyor while operating the belt, i.e. to support the belt, not the structure. The purpose of present invention is of a completely different character, since it is a applied to a completely different technical field. The invention improves the mobile characteristics a mobile conveyor, which is of course not at all relevant to a standard fixed floor mounted conveyor, which is not mobile. It is an object of the present invention to provide a mobile conveyor apparatus where the aforementioned disadvantages are significantly reduced.

This is obtained by a mobile conveyor apparatus of the kind mentioned in the introduction, and being characterized in that at least one of the support means is a temporary support means comprising regulation means capable of establishing and removing ground contact.

Hereby it is obtained that the temporary support means can establish ground contact when the mobile conveyor apparatus is stationarily positioned thereby relieving a significant portion of the strain on the frame of the bridge and on the travel support means which are permanently connected to the bridge. This is particularly needed when the movable arrangement supported by the bridge is located at a maximum distance from one of the travel support means since the frame of the bridge as well as the travel support means will experience the worst scenario from the viewpoint of strain. At such locations the temporary support means are provided so that they can thus relieve the strain both on the frame of the bridge and on the travel support means. This means that the frame of the bridge can be designed for a reduced load situation resulting in lesser requirements for the mass of the structural design and thus a lower weight of the bridge. This reduced weight for the bridge will also affect the travel support means so that they can also be dimensioned for a reduced strain situation leading to reduced size and costs. Furthermore, such temporary support means may be manufactured in a very simple way since they are not configured for movement on the ground and therefore will be relatively inexpensive. A lower weight of the mobile conveyor apparatus will also improve the viability of the equipment in connection with inadequate ground bearing conditions.

It is preferred that at least one temporary support means is arranged between two travel support means so that the mid-span between two such travel support means is supported. However, more temporary support means may be used between two travel support means if necessary and advantageous.

The temporary support means may in principle have any form and structure as long as they are suitable for acting as supports between the bridge and the ground, with capability to take up the load when the movable conveyor arrangement is moving on the bridge, especially in the situation where the movable conveyor arrangement is furthest away from a travel support means. The temporary supporting means may also in principle have all kinds of regulation means with capability to establish and remove ground contact so long as they are suitable for alternately bringing the means in and out of operation. However, it is preferred that the regulation means comprise support pads and retractable means such as hydraulic actuated cylinders capable of lowering or lifting the support pads to or from the ground. Such cylinders may preferably be mounted in an arrangement on the bridge, preferably on the underside of the bridge. The temporary support means are preferably permanently mounted on the bridge, however, they may be stand-alone units which are not permanently connected to the mobile conveyor apparatus but mounted when the bridge has been moved to its destination.

The movable arrangement supported by the bridge may be a movable conveyor arrangement comprising a cross conveyor and means, such as a tripper, for directing the material from the transport means to the cross conveyor. The cross conveyor may be independent of the movable conveyor arrangement and may be a stand-alone unit, preferably self-propelled. The movable arrangement can be configured to carry out efficient stacking of piles of material alongside the mobile conveyor apparatus but can also be configured with hoppers for reclamation and mining systems or being a combined system combining a conveyor arrangement with a hopper.

Preferably the travel support means capable of moving the mobile conveyor apparatus comprises a chassis on which the bridge is connected and a travel drive for moving the chassis. In principle, the travel drive may comprise any suitable means, such as wheels or tracks, so long as it is suitable for moving the bridge. However, it is preferred that crawlers are used for this purpose.

The invention will now be explained in greater detail with reference to the drawings, being diagrammatical, and where FIG. 1 shows a side elevation view of a mobile conveyor apparatus according to the invention, and FIG. 2a-c show three sectional views of the mobile conveyor apparatus shown in FIG. 1.

In FIG. 1 is shown a mobile conveyor apparatus 1 comprising two bridge sections 2a, 2b connected to each other to form an elongated bridge 2 which is substantially horizontally positioned. The bridge 2 may comprise a considerable number of sections, however, only two bridge sections 2a, 2b are shown in the drawing. The bridge sections 2a, 2b comprise a structural frame connected to each other by a joint 10 which allows the mobile conveyor apparatus 1 to follow uneven ground conditions. Mined material is introduced through a hopper 9 to a transport means in form of a belt conveyor 3 which is arranged on the top of the bridge 2 where it transports the material in the longitudinal direction of the bridge 2. A conveyor arrangement 6 with a cross conveyor and a tripper, which directs material from the belt conveyor 3 to the cross conveyor, is supported by the bridge 2 and movably connected to the upper part of the bridge 2. This conveyor arrangement 6 is configured for moving in both directions on the bridge 2 and the cross conveyor has a length and is located at a height that will ensure that a stack of material can be built alongside the mobile conveyor apparatus 1. The mobile conveyor apparatus 1 is at a number of locations supported both by travel support means 4 in the form of movable crawlers units (see FIG. 2c). These movable crawler units offer permanent support to the bridge 2 and move the bridge 2 from one position to another when required. Furthermore, when stationarily positioned, the bridge 2 at several locations is supported by temporary support means 5 which are mounted on the bridge 2 and comprising regulation means 7 with one or more hydraulic cylinders 8 connected to support pads 9 (see FIG. 2a). In this way the temporary support means 5 establish ground contact when the mobile conveyor apparatus 1 is stationarily positioned thereby relieving a significant portion of the strain on the frame of the bridge 2 and on the travel support means 4 which are permanently connected to the bridge 2. This is particularly needed when the conveyor arrangement 6 supported by the bridge 2 is located at a maximum distance from one of the travel support means 4 since the frame of the bridge 2 as well as the travel support means 4 will experience the worst scenario from the viewpoint of strain. At such locations the temporary support means 5 are provided so that they can thus relieve the strain both on the frame of the bridge 2 and on the travel support means 4. This means that the frame of the bridge 2 can be designed for a reduced load situation resulting in lesser requirements for the mass of the structural design and thus a lower weight of the bridge 2. This reduced weight for the bridge 2 will also affect the travel support means 4 so that they can also be dimensioned for a reduced strain situation leading to reduced size and costs. When the bridge 2 is to be moved, the movable conveyor arrangement 6 is positioned directly over one of the travel support means 4 and subsequently ground contact for the bridge 2 through the temporary support means 5 is inactivated or removed since they are not configured for movement on the ground. As the movable conveyor arrangement 6 is positioned directly over one of the permanent travel support means 4 the load will be taken up by these means which are sized for this load situation. In this way the frame of the bridge 2, which during movements, is not supported by the temporary supporting means 5 does not need to be dimensioned for a scenario, where the conveyor arrangement 6 is located at mid-span between two travel support means 4. Hence, the frame of the bridge 2 can be designed for a reduced load situation resulting in a lower weight of the bridge 2.

In FIG. 2a-c the support means 4, 5 for the mobile conveyor apparatus 1 is shown. FIG. 2a refers to section A-A in FIG. 1 and shows the temporary support means 5 in the situation where the mobile conveyor apparatus 1 is ready to move as the support pad 9 is lifted from the ground by the hydraulic cylinder 8. In this situation the movable conveyor arrangement 6 with the tripper and the cross conveyor will be positioned directly over a travel support means 4 to make sure that the load is taken up by this. FIG. 2b illustrates a situation where the bridge 2 is positioned and ready for operation since the hydraulic cylinder 8 has lowered the support pad 9 to ensure ground support being activated for the bridge 2 in that location. Here the bridge 2 is supported sufficiently to allow the movable conveyor arrangement 6 with the tripper and the cross conveyor to move between the travel support means 4. The hydraulic medium for the hydraulic cylinders is preferably provided from the main hydraulic system for the mobile conveyor apparatus 1. In FIG. 2c, section C-C in FIG. 1, a travel support means 4 connected to the bridge 2 is shown. It offers permanent support for the bridge 2 both when it is moving and when it is in operation and stationarily positioned. The travel support means 4 utilize crawlers to ensure optimum functionality and mobility.

A mobile stacking conveyor as referred to in this application is typically a single conveyor supported on a series of truss frames and crawler tracks. The trusses are connected typically by a special joint that allows the machine to follow uneven ground conditions and relieve stresses that could damage the structure.

A single conveyor belt flight runs along the top chord of the trusses the length of the mobile conveyor. The belt drive is typically located at the end of the machine, since this is normally closest to the electrical power.

The mobile conveyor tripper travels along the top chords of the mobile stacking conveyor. The tripper "trips" ore onto the cross conveyor belt and discharges the material onto the stack. The cross conveyor is long enough for the pile to be built to the design height while keeping the crawler track back from the advancing toe of the pad.

The above description of a mobile conveyor seeks to demonstrate how the technical field of mobile conveyors is very different from conventional overland fixed floor mounted conveyors both in terms of technical challenges and possibilities.

Although the invention has been described in the above in connection with preferred embodiments of the invention, it will be evident for a person skilled in the art that several modifications are conceivable without departing from the invention as defined by the following claims.

The invention claimed is:

1. A mobile conveyor apparatus comprising:
a bridge extending in a longitudinal direction and provided with at least one belt conveyor for conveying material in the longitudinal direction of the bridge;
a movable conveyor arrangement comprising a cross conveyor and a tripper, the cross conveyor and the tripper disposed on top of and supported by the bridge and configured to move in the longitudinal direction of the bridge on at least a portion of the bridge and the tripper being configured to direct material from the belt conveyor to the cross conveyor;
a plurality of support members extending from the bridge to the ground;
wherein at least one of the support members is a crawler unit connected to the bridge for moving the bridge on the ground;
wherein at least one of the support members is a temporary support comprising one or more hydraulic cylinders connected to one or more support pads for establishing and removing ground contact between the bridge and the ground, and
wherein the temporary support is configured to reduce strain on the bridge and the crawler unit due to the movable conveyor arrangement when the movable conveyor arrangement is located above the temporary support at a maximum distance from the crawler unit and when the temporary support is in contact with the ground.

2. A mobile conveyor apparatus according to claim 1, wherein at least one of the temporary supports is arranged between two crawler units.

3. A mobile conveyor apparatus according to claim 1, wherein at least one of the temporary supports is mounted on an underside of the bridge.

4. A mobile conveyor apparatus according to claim 1, wherein the crawler unit comprises crawlers.

5. A mobile conveyor apparatus according to claim 1, wherein the bridge comprises a number of bridge sections connected to each other.

6. A mobile conveyor apparatus according to claim 1, wherein the bridge is positioned substantially horizontally.

7. A mobile conveyor apparatus according to claim 1, further comprising position control means for automatic control of the temporary support as a function of a position of the movable conveyor arrangement on the bridge.

8. A mobile conveyor apparatus according to claim 1, further comprising height control means for automatic control of the temporary support as a function of a distance between the bridge, the bridge being in substantially horizontal position, and the ground.

9. A method for operating a mobile conveyor apparatus according to claim 1 wherein the method comprises the steps of inactivating at least of the temporary supports acting as support for the bridge before the at least one crawler unit moves the bridge and activating at least one of the temporary supports to support the bridge on the ground after the bridge has been moved to another position.

* * * * *